United States Patent [19]

Nagano

[11] Patent Number: 5,087,226
[45] Date of Patent: Feb. 11, 1992

[54] MULTI-STAGE SPROCKET ASSEMBLY FOR BICYCLE

[75] Inventor: Masashi Nagano, Izumi, Japan

[73] Assignee: Shimano Corporation, Osaka, Japan

[21] Appl. No.: 657,470

[22] Filed: Feb. 19, 1991

[30] Foreign Application Priority Data

Feb. 28, 1990 [JP] Japan .................................. 2-50152

[51] Int. Cl.⁵ .............................................. F16H 9/00
[52] U.S. Cl. .................................................. 474/160
[58] Field of Search ...................... 474/152, 155–157, 474/160, 164

[56] References Cited

U.S. PATENT DOCUMENTS

| | | | |
|---|---|---|---|
| 3,478,614 | 11/1969 | Shimano | 474/160 |
| 4,181,033 | 1/1980 | Nagano | 474/160 X |
| 4,268,259 | 5/1981 | Segawa et al. | 474/160 |
| 4,348,200 | 9/1982 | Terada | 474/160 |
| 4,773,893 | 9/1988 | Su et al. | 474/152 |

FOREIGN PATENT DOCUMENTS

| | | |
|---|---|---|
| 0021839 | 1/1981 | European Pat. Off. . |
| 0313345(A3) | 4/1989 | European Pat. Off. . |
| 0313345(A2) | 4/1989 | European Pat. Off. . |
| 3037857A1 | 4/1981 | Fed. Rep. of Germany . |
| 2469624 | 5/1981 | France . |
| 2532710 | 3/1984 | France . |
| 55-28617 | 8/1980 | Japan . |
| 57-39270 | 8/1982 | Japan . |
| 475021 | 11/1937 | United Kingdom . |
| 2005779 | 4/1979 | United Kingdom ............... 474/160 |

Primary Examiner—Thuy M. Bui
Attorney, Agent, or Firm—Dickstein, Shapiro & Morin

[57] ABSTRACT

A multi-stage sprocket assembly for a bicycle having a larger and a smaller sprockets attached adjacent to each other. The smaller sprocket has a concave portion defined in a side face thereof opposite to the larger sprocket. The concave portion is disposed at a position of the smaller sprocket which last interfers with a plate portion of a shifting chain segment extending between and engaging both the smaller and larger sprockets when the drive chain is shifted from the smaller sprocket to the larger sprocket.

5 Claims, 3 Drawing Sheets

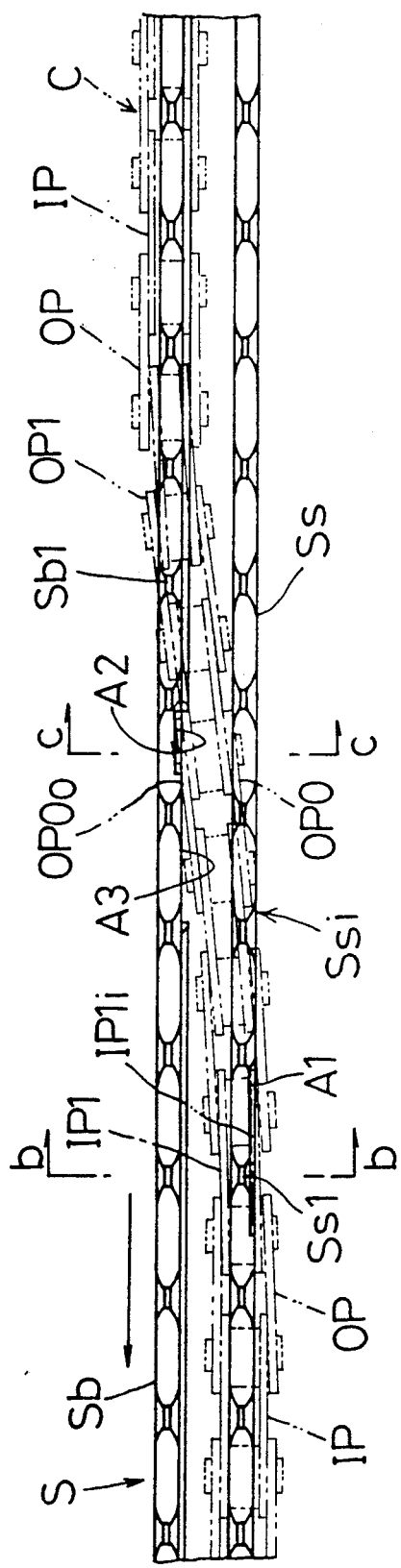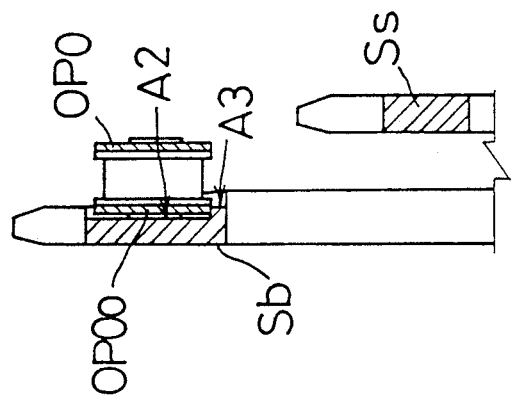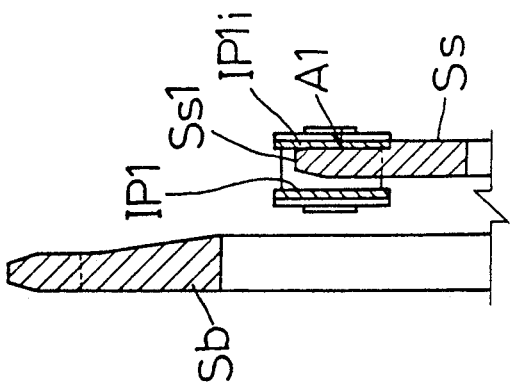

MULTI-STAGE SPROCKET ASSEMBLY FOR BICYCLE

BACKGROUND OF THE INVENTION

1. Field of the Invention

The present invention relates to a multi-stage sprocket assembly for a bicycle.

2. Description of the Related Art

A conventional multi-stage sprocket assembly includes more than two sprockets which have a same tooth thickness predetermined by a drive chain employed in combination with the assembly and also have a same teeth shape. For shifting the drive chain from a smaller-diameter sprocket to a larger-diameter sprocket, the shifting movement of the drive chain occurs only at certain teeth of the larger and smaller sprockets having a predetermined positional relationship relative to each other. This means that the smaller sprocket has a certain number of teeth which satisfy this positional relationship. In the course of the above shifting action of the chain from the smaller sprocket to the larger sprocket, an inner plate portion of the chain remains at a tooth of the smaller sprocket until completion of the chain shift, i.e. until complete disengagement of the chain from the smaller sprocket. Whereas, the shifting chain segment first engages a tooth of the larger sprocket at its outer plate portion subsequent to the above-described inner plate portion. To facilitate understanding of the essential spirits of the present invention, it is defined herein the above inner plate portion as a disengagement-interfering inner plate portion while the outer plate portion is defined as a engagement-leading outer plate portion. Similarly, the tooth of the smaller sprocket engaging with the trailing inner plate portion is defined herein as a disengagement-interfering tooth while the tooth of the larger sprocket engaging with the leading outer plate portion is defined as an engagement-leading tooth, respectively. Further, the disengagement-interfering tooth and the engagement-leading tooth are predetermined according to the numbers of the smaller and larger sprockets, assembled condition between these sprockets and so on.

In the above-described chain shift from the smaller sprocket to the larger sprocket, the shifting chain segement flexes between the inner and outer plates, thus the segment is inclined relative to the rotational direction of the sprocket assembly. Then, for avoiding excessive interference between the shifting chain segment and the sprockets and resultant chain jam problem, the prior art has suggested provision of a convex portion adjacent the engagement-leading tooth of the larger sprocket as a means for smoothing the chain shift. However, the prior art has paid no consideration to the smaller sprocket.

As a result, the inclination angle of the shifting chain segment is determined rather large by the disengagement-interfering inner plate portion and the vicinity of the disengagement-interfering tooth. Consequently, because of the large inclination angle, the chain segment flexes to an excessive degree thus still interfering with the chain shift.

Accordingly, the primary object of the present invention is to provide a multi-stage sprocket assembly for a bicycle with an improvement which can minimize the flexing amount of the shifting chain segment and interference between the disengagement-interfering inner plate portion and the disengagement-interfering tooth thus consequently smoothing the chain shift motion for a change-speed operation.

SUMMARY OF THE INVENTION

For accomplishing the above-noted object, a multi-stage sprocket assembly for a bicycle relating to the present invention comprises a larger sprocket and a smaller sprocket attached adjacent to each other; wherein the smaller sprocket has a concave portion defined in a side face thereof opposite to the larger sprocket, the concave portion being disposed at a position of the smaller sprocket which last interfers with a plate portion of a shifting drive chain segment extending between and engaging both the smaller and larger sprockets when the drive chain is shifted from the smaller sprocket to the larger sprocket.

According to the above-described features of the present invention, the concave portion is provided adjacent the disengagement-interfering tooth of the smaller sprocket and this concave portion is defined in the side face of the smaller sprocket opposite to the larger sprocket. Therefore, when the drive chain is shifted from the smaller sprocket to the larger sprocket, it is possible to draw the shifting chain segment closer to the larger sprocket. As a result, it becomes possible to reduce the inclination of the shifting drive chain segment as compared with the convention.

Consequently, no excessive flextion or resultant chain jam problem will occur when the shifting chain segment engages both the smaller sprocket and the larger sprocket, whereby the invention's sprocket assembly achieves smooth chain shift from the smaller sprocket to the larger sprocket.

Moreover, the construction of the present invention, if embodied as a front sprocket assembly for instance, has another advantage of reducing speed-change operational stroke of a front derailleur used in combination with the sprocket assembly. The reduced operational stroke enables a quick change speed operation.

Further and other objects, features and effects of the invention will become more apparent from the following more detailed description of the embodiments of the invention with reference to the accompanying drawings.

BRIEF DESCRIPTION OF THE DRAWINGS

Accompanying drawings illustrate one preferred embodiment of the present invention; in which, FIG. 3(a) is a plane view of the assembly in the chain shifting operation shown in FIG. 2, FIG. 3(b) is a section taken along a line b—b of FIG. 3(a), and FIG. 3(c) is a section taken along a line c—c of FIG. 3(a).

DESCRIPTION OF THE PREFERRED EMBODIMENTS

Preferred embodiments of the present invention as embodied as a front multi-stage sprocket assembly will now be described in details with reference to the accompanying drawings.

Figure 1:
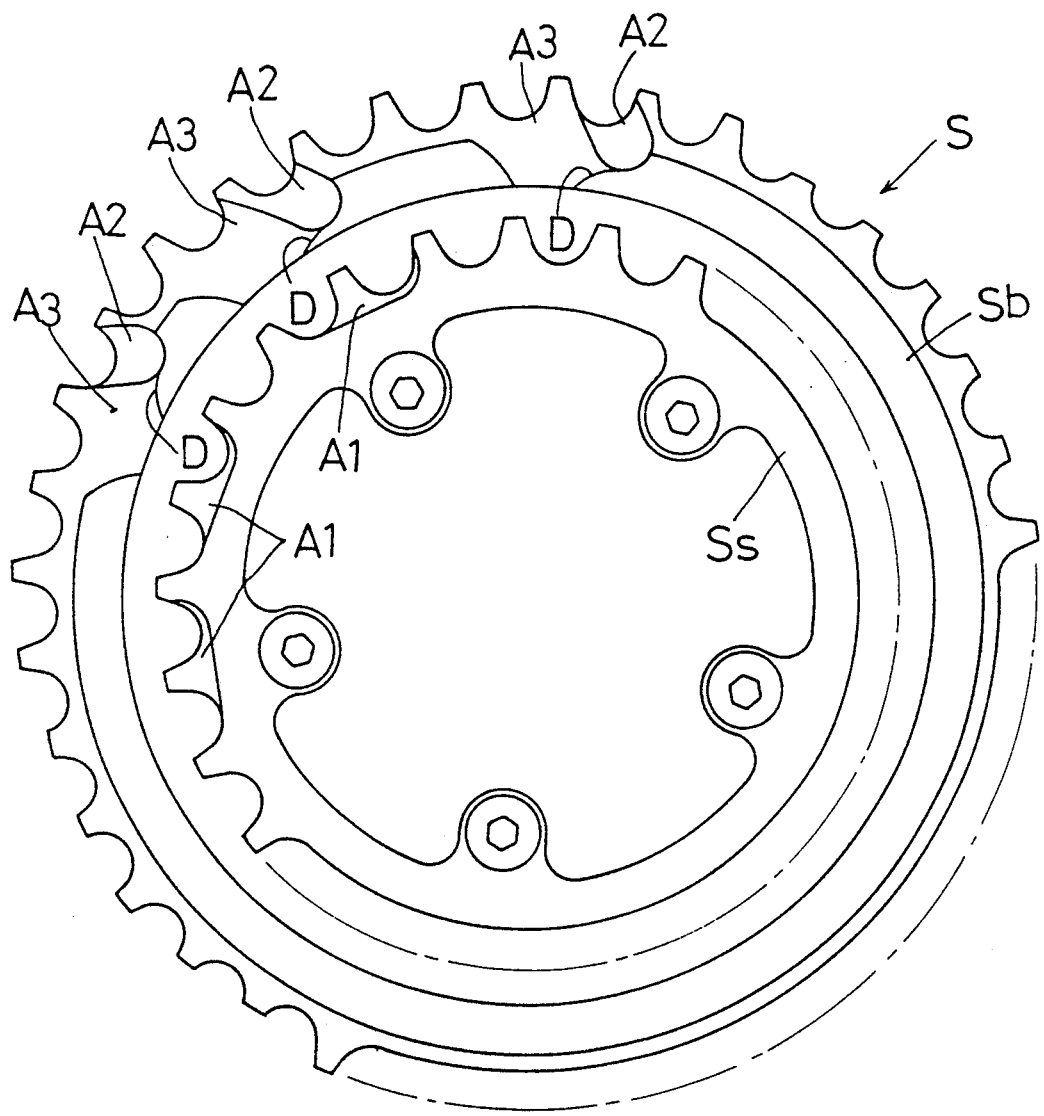
FIG. 1 is a front view of a multi-stage sprocket assembly according to the embodiment including a large sprocket and a small sprocket assembled with each other.

FIG. 1 is a front view of a front multi-stage sprocket assembly for a bicycle according to one embodiment, the assembly including a small sprocket Ss and a large sprocket Sb. The drawing shows this assembly as viewed from the side of the small sprocket Ss. As shown, the two sprockets Ss and Sb have a significant diameter difference as the assembly comprises a front sprocket assembly.

Figure 2:
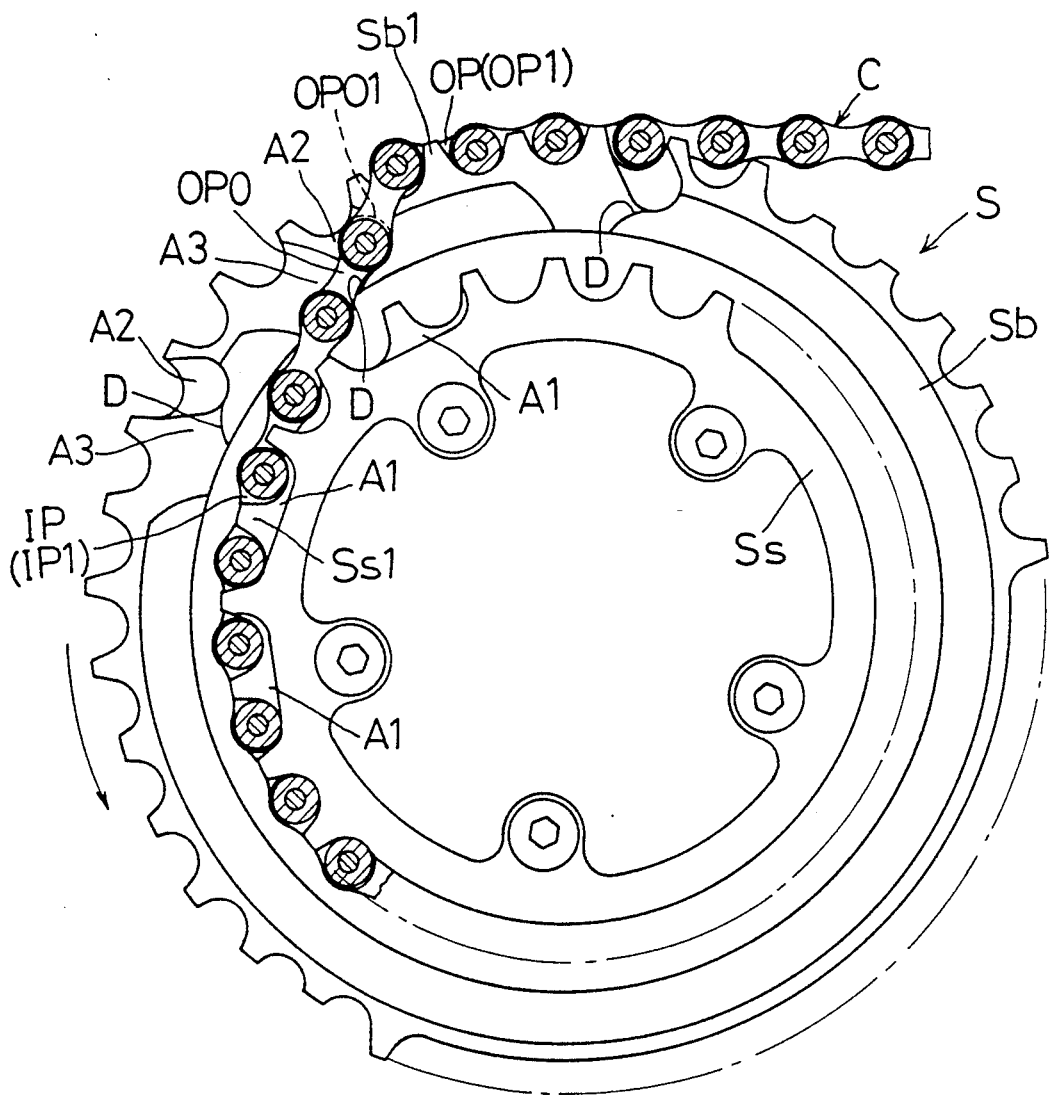
FIG. 2 is a front view of the sprocket assembly in a chain shifting operation.

For shifting a drive chain C from the small sprocket Ss to the large sprocket Sb to change a driving speed of the bicycle, the sprocket assembly S is rotated in a direction of an arrow in FIGS. 2 and 3, so that the chain shift takes place only at predetermined teeth of the sprockets. For instance, assuming that the large sprocket Sb has thirty six teeth while the small sprocket Ss has twenty six teeth, the assembly has ten combination positions in total where the chain shift is initiated. These combinations are automatically determined depending on the teeth-number relationship and the positional relationship between the sprockets. In the instant embodiment, the positional relationship is positively determined so that the chain shift takes place at predetermined portions of the small sprocket Ss. More specifically, there are provided a predetermined number of portions for a chain shift from the larger sprocket to the small sprocket and for a further chain shift from the small sprocket to the large sprocket, respectively; and the positional relationship is so determined as best for facilitating the chain shifts at these portions.

During the chain shift from the small sprocket Ss to the large sprocket Sb, an inner plate portion IP of the drive chain C engages with one of the predetermined teeth of the small sprocket Ss while an outer plate portion OP subsequent to the inner plate portion IP engages one of the predetermined teeth of the large sprocket Sb. In this invention, the inner plate portion is referred to as the disengagement-interfering inner plate portion IP1 and the tooth of the small sprocket Ss engaging this plate portion IP1 is referred to as the disengagement-interfering tooth Ss1. On the other hand, the outer plate portion OP first engaging the tooth of the large sprocket Sb is referred to as the engagement-leading outer plate portion OP1 while the tooth of the large sprocket Sb engaging this plate portion OP1 is referred to as the engagement-leading tooth Sb1, respectively. Further, a further outer plate portion OP connected through one inner plate portion IP with the engagement-leading outer plate portion OP1 is referred to as an interfering outer plate portion OP0.

FIG. 2 shows the sprocket assembly S and the drive chain under a chain shift. This condition is shown also in a plane view of FIG. 3(a). Further, FIGS. 3(b) and 3(c) are sections of the predetermined portions under the same condition. That is, these FIGS. 2 and 3 particularly illustrate the positional relationships of the disengagement-interfering inner plate portion IP1, the disengagement-interfering tooth Ss1, the engagement-leading outer plate portion OP1 and the interfering outer plate portion OP0.

First, the shaping of the vicinity about the disengagement-interfering tooth Ss1 will be described. As shown in FIG. 1, at lower and side areas of the disengagement-interfering tooth Ss1 overlapping with the disengagement-interfering inner plate portion IP1 and on the side of the small sprocket Ss, there is formed, by cutting, a first cutaway face A1, acting as a concave portion of the present invention, for restricting interfering between the disengagement-interfering inner plate IP1 and the disengagement-interferring tooth Ss1 relative to a rotational axis of the sprocket assembly. At the above-described portions, there would occur last interference between the inner plate IP1 and the tooth Ss1 without the first cutaway face A1. This first cutaway face A1 has a cutting depth gradually increasing toward its rear side where the degree of the above-described interference would normally increase. Incidentally, without the first cutaway face A1, the teeth positioned after the face A1 would intefere with a subsequent outer plate portion. However, the present invention does not relate to this interference.

Further, as shown in FIG. 2, when the interfering outer plate portion OP0 of the drive chain C gradually swings away from the small sprocket S, at portions along a pivotal path of a rear end OPO1 of this interfering outer plate portion OP0 where the shifting chain segment overlaps with the large sprocket Sb as viewed sidewise, there is defined a second cutaway face A2. Also, there is defined a third cutaway face A3 along a pivotal path of the interfering outer plate portion OP0. The second cutaway face A2 has a cutting depth greater than the third cutaway face A3. The above-defined portions where these second and third cutaway faces A2 and A3 are provided are where without these faces there would occur interference between the interfering outer plate portion OP0 and a lateral side face of the large sprocket Sb. Axial edges of these second and third cutaway faces A2 and A3 are formed as stepped portions D flush continuous with the other portion of the large sprocket having the normal, i.e. non-reduced thickness. Also, these stepped portions D are configurated according to the shaping of the lower contour of the plates of the shifting chain segment C.

Next, a chain shift operation will be described in connection with the above-described cutaway faces A1, A2 and A3.

In the instant embodiment, the multi-stage sprocket assembly S comprises a front sprocket assembly. Therefore, a chain shift takes place at upper regions of the assembly. First, with rider's operation of an unillustrated front derailleur, the chain C currently engaging the small sprocket Ss is displaced toward the large sprocket Sb. Then, as the chain shift further proceeds, the displaced chain segment is positioned adjacent along the lateral face of the large sprocket Sb. Then, the engagement-leading outer plate portion OP1 of the chain segement comes into engagement with the engagement-leading tooth Sb1 of the large sprocket Sb. FIG. 2 shows this first engagement where the sprocket assembly is about to further rotate. In this condition, as the chain C is flexed, as shown in FIGS. 3(a) and 3(b), a small-sprocket-side portion IP1i of the disengagement-interfering inner plate portion IP1 is placed in abutment against a small-sprocket-side side face portion Ssi of the small sprocket Ss. Also, a large-sprocket-side portion OP0o of the interfering outer plate portion OP0 is positioned closely along the lateral face of the large sprocket Sb.

In the above condition, as described hereinbefore, the first cutaway face A1 is provided at the small-sprocket-side face portion Ssi of the small sprocket Ss abutting the small-sprocket-side portion IP1i of the disengagement-interfering inner plate portion IP1. Thus, this first cutaway face A1 provides clearance to restrict the interference between the disengagement-interfering tooth Ss1 and the disengagement-interfering inner plate portion IP1, as illustrated in FIG. 3(b), thus allowing the inner plate portion IP1 to move closer to the large sprocket Sb. Accordingly, the flexing amount of the chain C during the chain shift is reduced and as a result the chain shift can be effected smoothly.

Next, functions of the second and third cutaway faces A2 and A3 will be particularly described.

Assuming now that the engagement-leading outer plate portion OP1 is about to engage the engagement-leading tooth Sb1 of the large sprocket under the condition that the disengagement-interfering inner plate portion IP1 is engaged with the disengagement-interfering tooth Ss1, the subsequent chain segment C extending from an unillustrated rear sprocket assembly is inclined towards the large sprocket Sb by means of the front derailleur whereby the engagement-leading outer plate portion OP1 and the large-sprocket-side portion of the interfering outer plate portion OP0 are placed in abutment against or adjacent the side face of the large sprocket Sb. Then, along the pivotal path where the rear end portion OP01 of the interfering outer plate portion OP0 and this plate portion OP0 per se move relative to the large sprocket Sb, the invention provides the second cutaway face A2 and the third cutaway face A3. With these, as illustrated in FIG. 3(c), the cutaway faces A2 and A3 provide clearance to allow movement toward the large sprocket Sb of the interfering outer plate portion OP0 acting to restrict the position between the shifting chain segment C and the large sprocket Sb in the direction of the thickness of the sprocket. That is, the chain segment C as positioned closely along the large sprocket Sb gradually pivots away from the small sprocket Ss. In this way, even under an incomplete engagement due to e.g. shallow engagement of the interfering outer plate portion OP1 (the condition where the interfering outer plate portion is positioned adjacent a starting end of the pivotal path), the invention can effectively reduce the flexing amount of the drive chain C thus assuring reliable chain shift.

In some conventional constructions employed often in recent years, the outer plate portions OP of the drive chain C are width-wise extended as one means to improve the chain shifting performance. In this case, the third cutaway face A3 of the present invention will function even more effectively.

Some other embodiments of the present invention will now be described.

In the foregoing embodiment, the multi-sprocket assembly comprises the two-sprocket assembly consisting of the large sprocket and the small sprocket. However, the prevent invention is applicable also to a sprocket assembly consisting of more than three sprockets. In such case, the invention's features are to be provided in accordance with the size relationship among these sprockets.

Further, in the above case where more than three sprockets comprise the multi-stage sprocket assembly, it is conceivable to use portions of the second and third cutaway faces A2, A3 provided to the large sprocket Sb of the foregoing embodiment as the first cutaway face A1 functioning for a chain shift to an even larger sprocket.

In the foregoing embodiment, the concave portions comprise the cutaway faces. Instead, any other means than the cutting may be employed for forming the concavity. Or, it is also conceivable to form the sprockets originally with such concavity.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A multi-stage sprocket assembly for a bicycle, the assembly comprising:
   a larger sprocket and a smaller sprocket attached adjacent to each other;
   wherein said smaller sprocket has a concave portion defined in a side face thereof opposite to said larger sprocket, said concave portion being disposed at a position of said smaller sprocket which last interfers with a plate portion of a shifting drive chain segment extending between and engaging both said smaller and larger sprockets when said drive chain is shifted from said smaller sprocket to said larger sprocket.

2. A multi-stage sprocket assembly as defined in claim 1, wherein said concave portion has a depth gradually increasing rearwardly in a drive rotation direction of the sprocket assembly.

3. A multi-stage sprocket assembly as defined in claim 2, wherein said drive chain includes a plurality of inner plates and outer plates alternately and pivotably connected with each other, said inner plates having a shorter width than said outer plates; said concave portion being configurated along a portion of said small sprocket contacting said inner plates longer at a tooth of small sprocket than the other inner plates during said chain shift.

4. A multi-stage sprocket assembly as defined in claim 3, wherein said concave portion is provided at a plurality of portions of said small sprocket according to various engaging conditions between said drive chain and said sprockets.

5. A multi-stage sprocket assembly as defined in claim 4, wherein said sprocket assembly is a front sprocket assembly.

* * * * *